United States Patent [19]

Lowry

[11] 3,804,980

[45] Apr. 16, 1974

[54] VERTICAL SHARPNESS ENHANCEMENT OF VIDEO PICTURES

[75] Inventor: John D. Lowry, Willowdale, Ontario, Canada

[73] Assignee: Ellanin Investments, Ltd., Toronto, Canada

[22] Filed: Mar. 1, 1972

[21] Appl. No.: 230,703

[52] U.S. Cl......178/7.1, 178/DIG. 25, 178/DIG. 34

[51] Int. Cl............................ H04n 5/14, H04n 5/21

[58] Field of Search........ 178/DIG. 25, 7.1, DIG. 34

[56] References Cited

UNITED STATES PATENTS

| | | | |
|---|---|---|---|
| 3,629,498 | 12/1971 | Tan | 178/DIG. 25 |
| 2,757,236 | 7/1956 | Bedford | 178/DIG. 25 |
| 2,759,044 | 8/1956 | Oliver | 178/DIG. 25 |
| 2,962,548 | 11/1960 | Taudt | 178/DIG. 25 |

OTHER PUBLICATIONS

Gibson et al., A Vertical Aperture Equalizer for Television SMPTE, Vol. 60, No. 6, June 1960, pp. 395–401.

*Primary Examiner*—Howard W. Britton
*Attorney, Agent, or Firm*—Mellin, Moore & Weissenberger

[57] ABSTRACT

The vertical sharpness of scanned video pictures is enhanced by interlacing the conventional two-field, 525-line scan with a pair of auxiliary field scans duplicating the conventional fields. At vertical transitions, the conventional intra-field comparison enhancement signal is combined with an inter-field comparison enhancement signal to produce a one-line enhancement signal which is then applied to the auxiliary scan only. As a result, the vertical transition takes place in approximately 0.1 percent of the picture height as compared to approximately 0.8 percent of the picture height as in conventional systems.

13 Claims, 3 Drawing Figures

VERTICAL SHARPNESS ENHANCEMENT OF VIDEO PICTURES

BACKGROUND OF THE INVENTION

Proper reproduction of sharp edges in video pictures is a problem of long standing. Conventionally, edge enhancement techniques have been developed from the recognition that a visual impression of a sharp edge can be created in the observer by providing a narrow over-brightened strip along the light side of the transition, and a narrow over-darkened strip along its dark side.

The most widely used method of achieving this result consists of comparing three successive lines of the field (the prime line being scanned, the preceding line, and the following line) during the field scan, and deriving from this comparison an enhancement signal which is added to the prime line signal to provide the required emphasis on each side of the transition. The problem with this method is that, although the appearance of the transition is improved, the resolution of the picture is actually degraded because the transition, in view of the pre-emphasis and post-emphasis, requires two lines in each field, for a total of four lines.

With the advent of electronic film recording and large-screen technologies, an entirely new approach to the problem of edge sharpness became necessary to provide the sharpness and resolution demanded by these technologies. The present invention provides such a new approach to improve edge sharpness by about an order of magnitude with relatively simple circuitry.

SUMMARY OF THE INVENTION

The invention combines the conventional intra-field comparison enhancement method (which results in poor resolution) with an inter-field comparison enhancement method (which is subject to motion-caused distortion) to produce a single-line enhancement signal which has better resolution than each of its component methods, and which is free of distortion. The combination is preferably achieved by using one enhancement signal to gate the other, as this preserves the magnitude of the enhancement signal, which is controlled by the percentage of intensity change at the transition.

In a preferred embodiment, the invention further combines this technique with a duplicate two-field scan interlaced between the normal two-field scan. The enhancement signal is applied to only one of the scans, so that the single-line transition produced by the inventive enhancement technique represents only about one one-thousandth of the picture height in the standard 525-line video system.

It is therefore the object of this invention to provide a vertical transition enhancement signal which is only one line wide.

It is another object of this invention to produce such an enhancement signal by combining an intra-field enhancement signal and an inter-field enhancement signal.

It is a further object of this invention to further improve transition sharpness by interlacing the normal scan with an identical duplicate scan, and to apply the enhancement signal to only one of these scans.

BRIEF DESCRIPTION OF THE DRAWINGS

FIGS. 1a through 1g are time-amplitude diagrams showing prime-line and enhancement signals associated with a stationary vertical transition;

DESCRIPTION OF THE PREFERRED EMBODIMENT

Figure 1A:
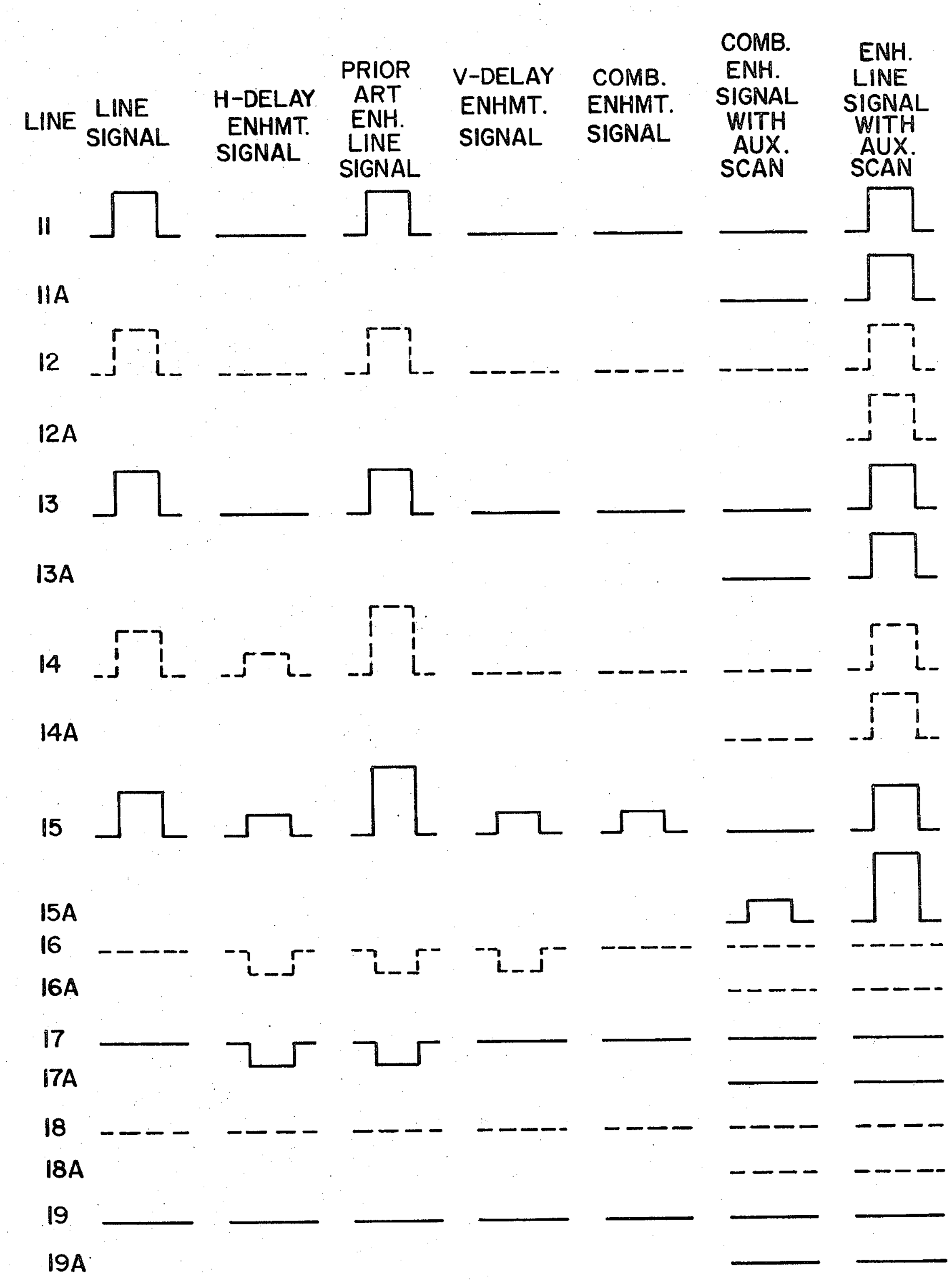

FIG. 1a shows the prime line signals of a group of successive video picture scan lines, numbered 11 through 19, which trace in the normal manner the bottom portion of a rectangular light-colored object against a dark background. Lines 11, 13, 15, 17 and 19 are lines of the odd field (shown solid) of the frame constituting the picture, while lines 12, 14, 16 and 18 are lines of the even field (shown dotted) scanned subsequently to the odd field and interlaced with it. The vertical transition from the light-colored object to the dark background occurs between lines 15 and 16.

In the usual prior art enhancement method, enhancement was achieved by adding to the prime line signal an enhancement signal $E_H$ equalling the prime line signal $L_3$ minus one-half of the sum of the signals $L_1$ and $L_5$ representing the preceding and following line, respectively, of the same field. Mathematically, the prior art enhancement signal was expressed as $E_H = L_3 - (L_1 + L_5)/2$. This prior art enhancement signal is shown in FIG. 1b.

FIG. 1c shows the enhanced prime line signal $L_3 + E_H$ produced by conventional methods. It will be noted that the visual edge effect is produced by over-whitening the signal in lines 14 and 15 and over-blackening it (symbolically shown by a negative signal level) in lines 16 and 17. In actual practice, the principal enhancement occurs on the white side, as the dark-side enhancement tends to produce a less noticeable visual effect and tends to disappear at a transition in which one side is already completely black.

The fact that the transition occurs once in each field accounts for the fact that the enhancement signal affects four lines, two in the odd field and two in the even field. In the usual 525-line scan, the transition is thus spread over about 1/130 (i.e., roughly 0.8 percent) of the picture height.

One way of reducing this spread, in accordance with the invention, is to derive the enhancement signal not from the prime line and the two adjacent same-field lines, but from the prime line and the two adjacent opposite-field lines in accordance with the formula $E_V = L_3 - (L_2 + L_4)/2$, in which $L_2$ and $L_4$ are the line signals of, e.g., the two even-field lines adjacent to the odd-field prime line $L_3$.

In other words, the enhancement signal for line 15, instead of being derived from lines 13, 15, and 17, is now derived from lines 14, 15 and 16. As shown in FIG. 1d, the enhancement signal now affects only two lines, i.e., lines 15 and 16. This inter-field comparison method (hereinafter referred to as the V-delay method because it compares signals which are essentially one vertical scan time apart) therefore provides resolution superior to that of the intra-field method of the prior art (hereinafter referred to as the H-delay method because it compares signals which differ from one another by one horizontal scan time).

Figures 2A, 2B, 2C, 2D, 2E, 2F, 2G:
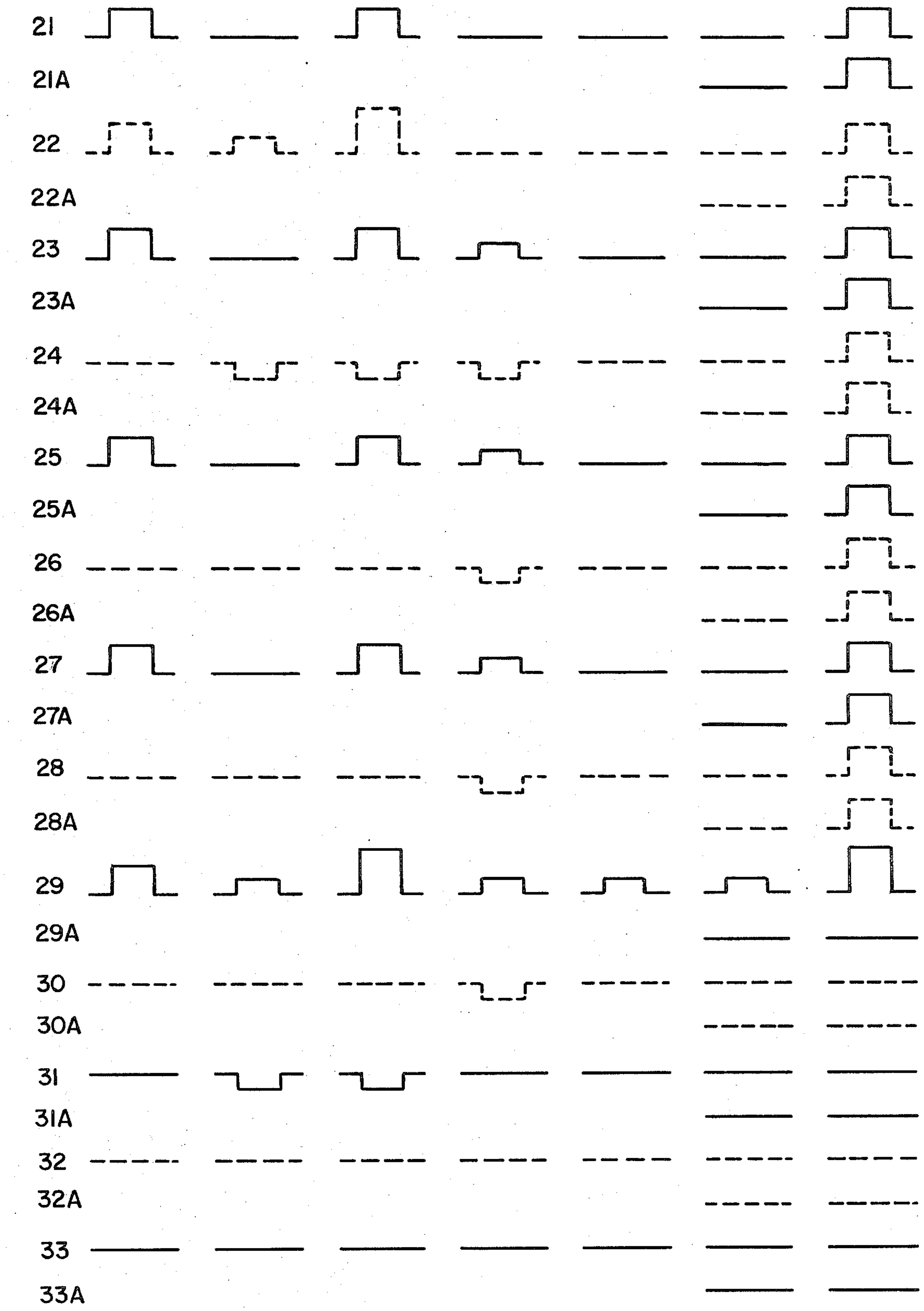
FIGS. 2a through 2g are time-amplitude diagrams showing corresponding prime-line and enhancement signals associated with an upwardly moving vertical transition.

Unfortunately, the V-delay method has a drawback which normally makes it unsuitable for all but certain special applications. As shown in FIG. 2*d*, vertical motion of the interface between fields causes the V-delay method to produce alternating black and white enhancement signals throughout the entire area between the position of the interface during the odd scan and its position during the even scan. The visual distortion created by these alternating enhancement signals appears as a series of objectionable bright stripes along the object whenever it moves.

To overcome this problem, the invention combines the H-delay method and the V-delay in a novel manner to produce a transition enhancement signal which is better than either the H-delay or the V-delay enhancement signal alone, and has the disadvantages of neither. Referring to FIGS. 1*e* and 2*e*, it will be seen that the combination enhancement signal is produced by gating the H-delay and V-delay enhancement signals with one another. This causes a positive enhancement signal to be produced only when the H-delay and V-delay enhancement signals are both positive, a phenomenon which occurs only once (i.e., in one line) for each transition.

The gating of one signal with the other preserves the natural magnitude of the gated signal. If a transition is less than a 100 percent change in intensity, the enhancement signal is accordingly smaller, and should be so transmitted. The minimum change which will cause any enhancement at all can be set by adjusting the response level of the gate to the control signal derived from the gating enhancement signal.

As FIG. 2*e* shows, the emphasis occurs in the inventive system for one line on the light side of the transition only. By gating through a negative combination enhancement signal whenever both the H-delay and V-delay enhancement signals are negative, a dark emphasis can also be created on the dark side of the transition. However, it will be noted that in the example shown in FIG. 2*e*, the transition in the odd field occurs between lines 29 and 31, whereas the transition in the even field (which is normally scanned approximately one/sixtyth second later than the odd field) occurs between lines 22 and 24, the object having moved upward that far between the odd-field scan and the even-field scan. In a number of high-quality applications, it is undesirable to thus separate the white and black emphases in the picture; and, as has been pointed out above, the black emphasis is generally less noticeable anyway; therefore, black emphasis signals have been gated out in the preferred embodiment of the invention.

Confining the enhancement signal to one line, or even one line in each field, makes possible a further sharpness improvement in certain applications by using an auxiliary scan. For example, in the recording of video images on film, particularly in the non-real-time recording system described in my copending application Ser. No. 209,859, filed Dec. 20, 1971, and entitled VIDEO-TO-FILM CONVERSION PROCESS, a requirement for extreme sharpness exists while the scan time necessary to produce a frame of film is relatively immaterial.

Under these circumstances, a high degree of sharpness can be obtained by scanning each frame twice, once with the regular scan and once with an identical scan displaced from the regular scan by one half on one line interval. With the usual 525-line video scan, this procedure results in a 1,050-line picture in which, designating the lines of the auxiliary scan by the suffix "A," the lines appear in the following order: 1, 1A, 2, 2A, 3, 3A, etc. In the absence of an enhancement signal, lines 1 and 1A are identical; 2 and 2A are identical, etc. Timewise, the fields of the picture are scanned in this order: Odd field, even field, odd auxiliary field, even auxiliary field, etc. The enhancing circuitry is disabled during the regular scan, so that the combination enhancement signal appears only in the auxiliary scan, as shown in FIG. 2*f*.

Consequently, the system of this invention, when combined with an auxiliary scan, produces a white-enhanced transition in only about one/one-thousandth (or about 0.1 percent) of the picture height, as shown in FIG. 2*g*. This amounts to an eight-fold improvement over the prior art and accounts for a very readily visible increase in picture quality.

Figure 3:
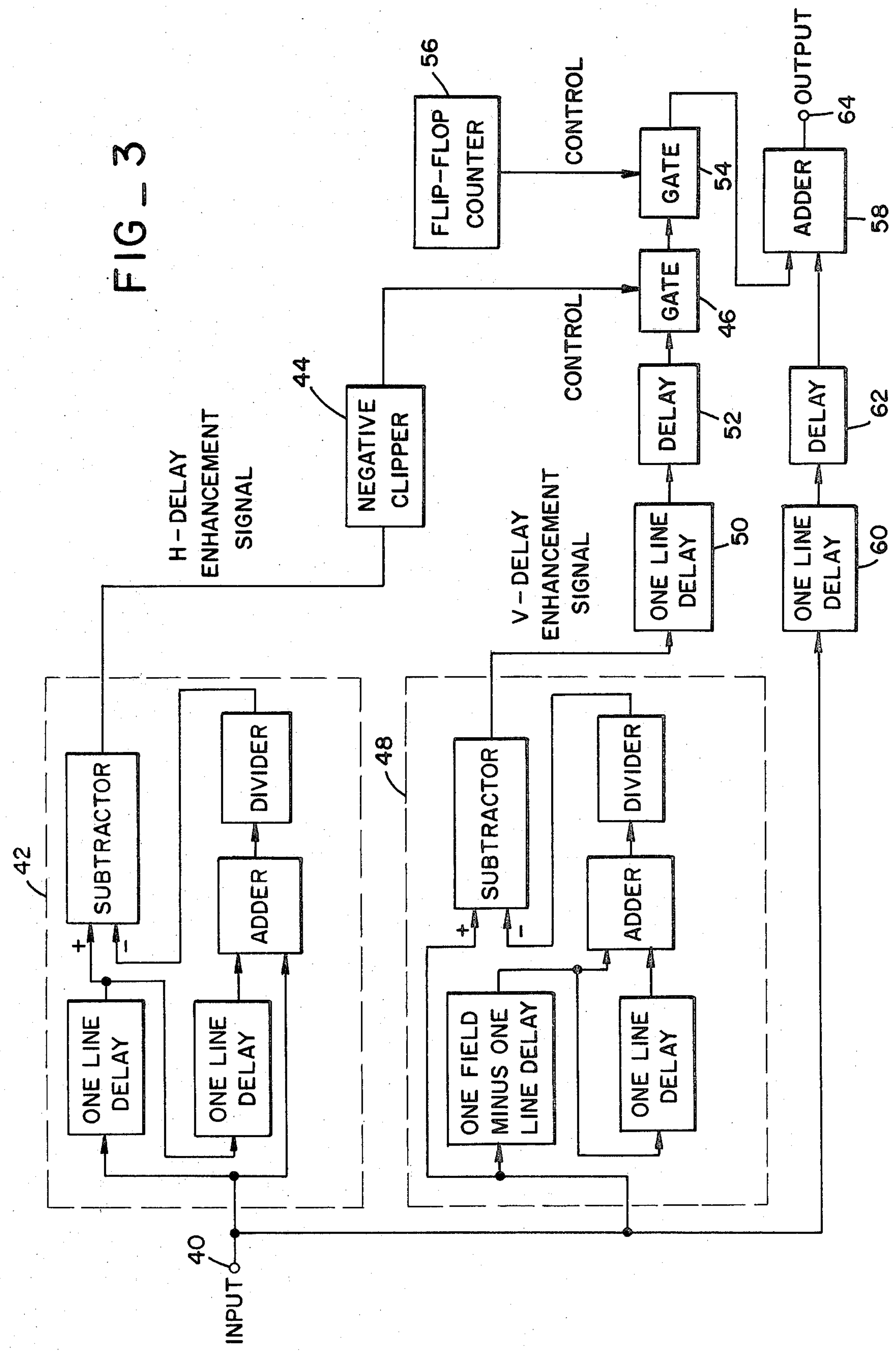
FIG. 3 is a circuit diagram in block form showing a preferred embodiment of the electronic circuitry for carrying out the invention.

The circuitry for carrying out the above-described techniques is relatively simple. As shown in FIG. 3, the prime line signal is supplied to the apparatus at input 40. The prime line signal is applied to a standard commercial image enhancer 42 whose enhancement signal output produces the H-delay enhancement signal of FIGS. 1*b* and 2*b*. This signal is processed through a negative clipper 44 to eliminate the negative signals appearing in lines 16 and 17 of FIG. 1*b*, and in lines 24 and 31 of FIG. 2*b*. The remainder of the H-delay enhancement signal becomes the control signal for gate 46.

The prime line signal from input 40 is also applied to a somewhat modified image enhancer 48 in which one of the one-line delays which produce successive lines of the same field has been replaced with a one-field-minus-one line delay, and the circuit inputs have been reconnected to produce successive lines of the picture. The enhancement signal output of the enhancer 48 produces the V-delay enhancement signal.

Inasmuch as the prime line output of enhancer 42 (the + input to its subtractor) contains a one-line delay and the prime line output of enhancer 48 does not, the V-delay enhancement signal needs to be delayed by one line in delay device 50, with a further short delay being introduced by delay line 52 to compensate for the inherent delay introduced by clipper 44.

The properly delayed V-delay enhancement signal is then presented to gate 46, which it can pass only if a positive H-delay enhancement signal is also present to actuate gate 46. In addition, if an auxiliary scan is used, the V-delay enhancement signal also has to go through gate 54, which it can pass only if flip-flop counter 56 identifies the field currently being scanned as an auxiliary field.

If both gates 46 and 54 are enabled, the V-delay enhancement signal is added in adder 58 to the prime line signal from input 40, which has been appropriately delayed by one-line delay 60 and by compensating delay 62, which compensates for the delays introduced by delay device 52, gate 46, and gate 54. The output of adder 58 is the enhanced signal output 64 of the apparatus, at which the signals of FIGS. 1*g* and 2*g* appear.

Negative clipping of the V-delay enhancement signal is unnecessary because, as appears from a comparison of FIGS. 1*b* and 1*d*, or 2*b* and 2*d*, a negative V-delay enhancement signal cannot occur simultaneously with a positive H-delay enhancement signal.

What is claimed is:

1. A method of enhancing the vertical sharpness of a video picture scanned in the form of two interlaced fields, comprising the steps of:

a. comparing the prime line being scanned with the preceding and following lines of the same field to derive a first enhancement signal defined by the equation $$E_H = L_3 - (L_1 + L_5)/2$$

in which $E_H$ is said first enhancement signal; $L_3$ is the line signal of the prime line being scanned; and $L_1$ and $L_5$ are the line signals of the next preceding and next following lines, respectively, of the same field;

b. comparing the prime line being scanned with the next adjacent lines of the other field to derive a second enhancement signal defined by the equation $$E_V = L_3 - (L_2 + L_4)/2$$

in which $E_V$ is said second enhancement signal; $L_3$ is the line signal of the prime line being scanned; and $L_2$ and $L_4$ are the line signals, respectively, of the lines of the other field immediately above and below the prime line;

c. producing a combination enhancement signal from a coaction of said first and second enhancement signals, said combination enhancement signal not being produced when said first and second enhancement signals are not present substantially simultaneously; and d. combining said combination enhancement signal with said prime line signal to produce a prime line signal adapted to substantially enhance the vertical sharpness of the picture.

2. The method of claim 1, further comprising the step of clipping off the negative portions of at least one of said first and second enhancement signals so that said combination enhancement signal is produced only when both said first and second enhancement signals are positive.

3. The method of claim 1 further comprising the step of further interlacing the regular interlaced-field scan of said picture with an auxiliary scan identical to said regular scan to produce a picture having twice as many lines as the regular interlaced-field scan, and combining said combination enhancement signal with said prime line signal only in either said regular scan or said auxiliary scan.

4. The method of claim 3, in which said combination enhancement signal is combined with said prime line signal only in the auxiliary scan.

5. The method of claim 1, in which said combination enhancement signal is produced by gating one of said first and second enhancement signals with the other.

6. The method of claim 5, in which said $E_V$ signal is gated by said $E_H$ signal.

7. The method of claim 6, in which said $E_V$ signal is gated only by positive portions of said $E_H$ signal.

8. The method of claim 6, in which said $E_V$ signal is gated only by portions of said $E_H$ signal whose amplitude exceeds a predetermined level.

9. A method of enhancing the vertical sharpness of a video picture scanned in the form of two interlaced fields, comprising the steps of:

a. producing an auxiliary scan identical to the regular interlaced-field scan of said picture and further interlaced therewith to produce a picture having twice as many lines as the regular interlaced-field scan;

b. producing an enhancement signal to enhance the line signal of said picture at vertical transitions; and c. applying said enhancement signal to said line signal only in either said regular scan or said auxiliary scan.

10. A vertical sharpness enhancement device for video pictures produced by interlaced scans, comprising:

a. a reference signal input;

b. H-delay enhancement signal producing means connected to said reference signal input for producing an enhancement signal whenever the vertically aligned picture information in two successive lines of the picture is substantially nonidentical;

c. V-delay enhancement signal producing means connected to said reference signal input for producing an enhancement signal whenever the vertically aligned picture information in corresponding lines of two successive fields of the picture is substantially nonidentical;

d. gate means arranged to pass said V-delay enhancement signal only in the presence, in time coincidence with said V-delay enhancement signal, of a corresponding H-delay enhancement signal having at least a predetermined minimum amplitude; and e. adder means for adding the output of said gate means and said reference signal in time coincidence with the corresponding V-delay enhancement signal to produce a vertically enhanced reference signal.

11. The device of claim 10, further including clipping means for preventing negative H-delay enhancement signals from being applied to said gate means.

12. The device of claim 10 as applied to a picture produced by a pair of identical interlaced-field scans interlaced with one another, further including second gate means in series with the first said gate means, and control means connected to said second gate means so as to pass said V-delay enhancement signal only during one of said pair of scans.

13. A vertical sharpness enhancement device for video pictures produced by interlaced scans, comprising:

a. a reference signal input;

b. H-delay vertical enhancement signal producing means connected to said reference signal input and including:

i. first delay means connected to said reference signal input for delaying said reference signal by one line;

ii. second delay means connected to the output of said first delay means for further delaying said reference signal by one line;

iii. means for adding said reference signal and the output of said second delay means and attenuating their sum by a predetermined amount; and iv. comparator means for algebraically subtracting the output of said last-named means from the output of said first delay means to produce an H-delay enhancement signal;

c. V-delay vertical enhancement signal producing means connected to said reference signal input and including:

i. third delay means connected to said reference signal input for delaying said reference signal by one field minus one line;

ii. fourth delay means connected to the output of said third delay means for further delaying said reference signal by one line;

iii. means for adding the outputs of said third and fourth delay means and attenuating their sum by a predetermined amount; and iv. comparator means for algebraically subtracting the output of said last-named means from said reference signal to produce a V-delay enhancement signal;

d. gate means arranged to pass said V-delay enhancement signal only in the presence, in time coincidence with said V-delay enhancement signal, of an H-delay enhancement signal having at least a predetermined minimum amplitude; and e. adder means for adding the output of said gate means and said reference signal in time coincidence with the corresponding V-delay enhancement signal to produce a vertically enhanced reference signal.

* * * * *